June 11, 1957  J. F. NENZELL  2,795,444
SEALING WASHER

Filed March 15, 1954  2 Sheets-Sheet 1

J. F. NENZELL INVENTOR.

BY S. Tierney Jr

J. F. NENZELL  INVENTOR.

BY S. Tierney Jr.

United States Patent Office 2,795,444
Patented June 11, 1957

2,795,444

SEALING WASHER

Joseph F. Nenzell, Los Angeles, Calif., assignor to Rohr Aircraft Corporation, Chula Vista, Calif., a corporation of California Application March 15, 1954, Serial No. 416,229

5 Claims. (Cl. 288—23)

This invention relates to a sealing device adapted for making a sealed joint with a cylindrical member and is especially adapted for the sealing of fastening members such as rivets, screws, bolts and similar members used for securing two, or more members together into a rigid assembly. The sealing device is especially useful for fasteners used to connect sheet metal parts together which require hermetic sealing such as the joint between the walls of a tank or other vessel used to contain liquid, air or other gas under pressure or between a removable door of such a tank and the wall to which it is secured.

An object of the invention is to provide such a sealing device composed of a rigid portion and a portion composed of resilient, deformable material made up as a single member in which the parts are permanently fastened together.

Another object is to provide a composite sealing member capable of effectively sealing fasteners such as bolts and rivets irrespective of variations in the size of the fasteners due to manufacturing tolerances.

A further object is to provide such a sealing member which can easily and quickly be put in position on the shank of a fastener to be sealed and is not damaged by the tightening of the fastener so that it may be reused after removal from an initial installation, the member containing resilient sealing material which resumes its original shape after removal from the fastener.

Further objects will become apparent as the description of the sealing member proceeds. For a better understanding of the invention reference is made to the accompanying drawings in which.

Figure 3:
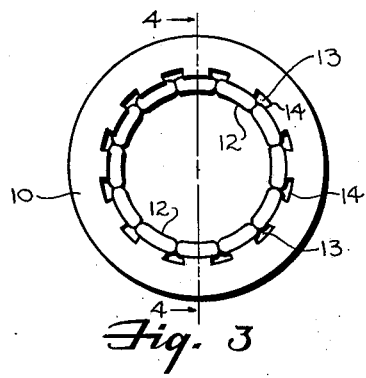
Fig. 3 is an enlarged front view of the retainer completely formed.
Figure 5:
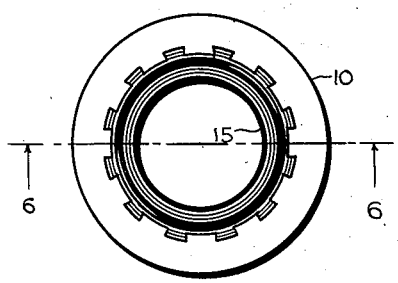
Fig. 5 is an enlarged front view of a complete sealing member.
Figure 6:
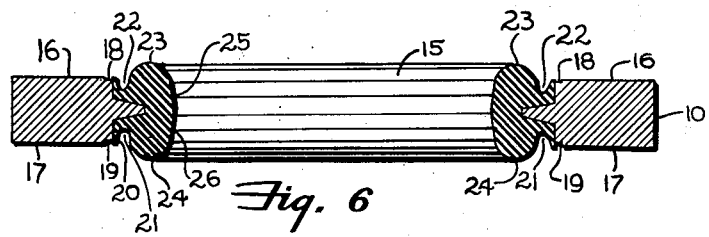
Fig. 6 is an enlarged sectional view of the sealing member of Fig. 5 taken on the line 6—6.

Referring to Figures 1 to 4, my invention comprises an annular retainer 10 punched out of steel, brass, aluminum, plastic or other rigid material and having a plurality of radially extending fingers 11, the retainer being punched out of thin sheet stock in a punch press. The fingers are then deformed by a punch into the shape shown in Figures 3 and 4, so that the fingers become progressively thinner toward their inner ends 12. This thinning of the metal causes the inner ends 12 to approach each other and in one embodiment of the invention, these ends may come into actual contact, as shown in Fig. 3, thereby forming a series of openings 13, each opening having a curved marginal wall 14 which entirely surrounds the opening. Molded in retainer 10 is a sealing ring 15 of natural or artificial rubber, neoprene or like material which is resilient and returns to its original shape after deformation. Ring 15 is molded in situ and portions of it extend through the openings 13 so that the ring is not only secured to the retainer by portions of its resilient material extending through openings 13 but also by joining through vulcanization to other portions of the sealing material. A very strong connection is thus established between the ring and retainer so that there is no possibility of their coming apart without breaking the sealing material. The flat faces 16, 17 of retainer 10 are provided with very shallow annular depressions 18, 19 where ring 15 meets these faces (see Fig. 6). The wall of ring 15 curves inwardly at 20 to form a pair of circular grooves or depressions 21, 22 inwardly of which it curves out to provide a pair of annular lobes 23, 24 which extend beyond the planes of faces 16, 17. The inside of the ring has faces 25, 26 which converge towards a plane through the center of fingers 11. Lobes 23, 24 are designed so that when ring 15 is compressed to a thickness equal to the thickness of retainer 10, the material is distorted to completely fill up the grooves 21, 22 and also to force the wall formed by faces 25, 26 into sealing contact with the bolt, rivet or other member to be sealed, the wall shape 25, 26 at the same being deformed to a cylindrical shape. By provision of the grooves 21, 22 none of the rubber is ever forced over the flat faces 16 or 17 of retainer 10 when the seal is tightened, thus always assuring metal to metal contact between the parts.

Figure 7:
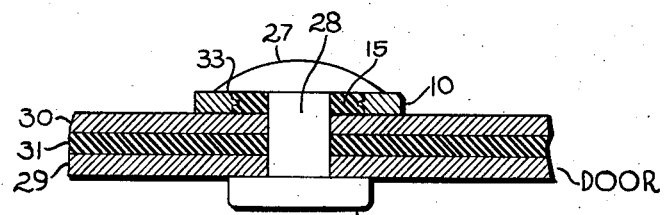
Fig. 7 is a sectional view through a fastener embodying the invention used for securing a door.

Fig. 7 illustrates the use of the seal under the manufactured or preformed head 27 of a rivet 28, a number of such rivets passing through all four edges of a door 29 fastened to the wall 30 of a tank or other vessel adapted to hold liquid or gas under pressure, a continuous sealing gasket 31 extending along the edge of the door and being compressed when the head 32 of the rivet is driven. When head 32 is driven, ring 15 is distorted into sealing contact with the flat face 33 of the head, with the top face of wall 30 and with the cylindrical shank of the rivet irrespective of the small variations in shank diameter due to manufacturing tolerances. Any leakage out of the tank along the riveted joint is thus prevented by my composite sealing member and, since it is a single piece, it is easily handled and put in place on the rivet.

Figure 8:
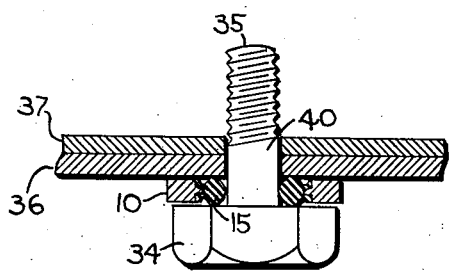
Fig. 8 is a sectional view showing the sealing device used with a bolt before the bolt is tightened.
Figure 9:
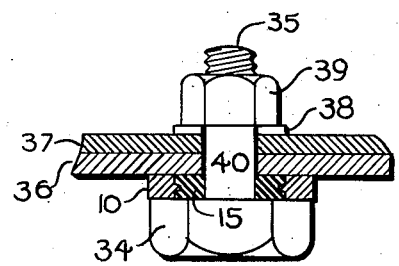
Fig. 9 shows the assembly after tightening the bolt.

Fig. 8 shows the composite sealing member in position under the hexagonal head 34 of bolt 35 used to fasten two metal sheets 36, 37 together, sealing ring 15 being in its undistorted condition. Figure 9 shows the assembly after a metal washer 38 and nut 39 have been applied and the nut tightened to draw the sheets together and seal the joint. Ring 15 has been distorted into sealing contact with the bolt head 34, lower sheet 36 and the smooth cylindrical portion 40 of the bolt shank. When used for sealing rivets, bolts, screws and similar fasteners, the inside diameter of ring 15 is preferably made slightly greater than the shank diameter of the fastener so the composite sealing member may be easily slid along the shank of the fastener without being damaged or distorted.

Figure 10:
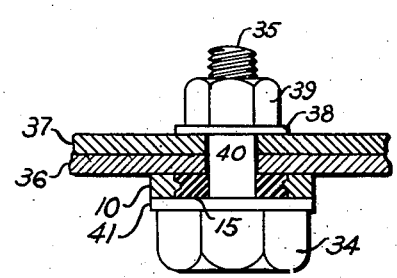
Fig. 10 is a sectional view of another embodiment of the invention.

Figure 10 shows a sealed fastener assembly in all respects similar to Fig. 9 but having a thin circular metal washer 41 interposed between the head of bolt 35 and sealing ring 15.

Figure 2:
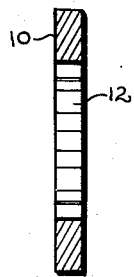
Fig. 2 is a sectional view through line 2—2 of Fig. 1.
Figure 1:
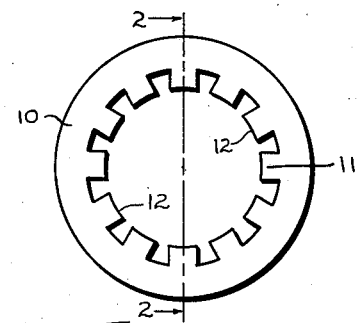
Fig. 1 is an enlarged front view of a metal retainer partly formed and used in the invention.
Figure 4:
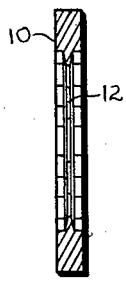
Fig. 4 is a sectional view through line 4—4 of Fig. 3.
Figure 11:
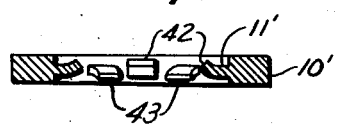
Fig. 11 is a sectional view of a modified form of metal retainer for use with the invention.

Fig. 11 shows a modified form of retainer 10′ which may be used in conjunction with a resilient sealing ring in the manner above described. In this modification the inwardly extending fingers 11′ are of uniform width, as shown in Fig. 1, but the inner ends of alternate fingers are bent up as indicated at 42 while the inner ends of the others are bent down, as indicated at 43. A retainer of this shape becomes very strongly attached to a sealing ring 15 of the shape above described or to a rubber O ring of circular cross section when the O ring is molded to the fingers.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secured by Letters Patent is:

1. A composite sealing device adapted to be compressed between a laminated structure and the head of a fastener passing through the structure, comprising an annular rigid retainer having a circular body with parallel end faces, said body having integral therewith a plurality of inwardly extending fingers, said fingers being spaced apart at their outer ends, each of said fingers being in contact with the fingers adjacent thereto near its inner end; a sealing ring of resilient deformable material enclosing the inner ends of said fingers and having an outer marginal portion extending into the spaces between said fingers, said sealing ring having aligned circular convex portions extending inwardly of said fingers, the thickness of the ring across said convex portions being greater than the thickness of said retainer body.

2. A composite sealing device adapted to be compressed between a laminated structure and the head of a fastener passing through the structure, comprising an annular rigid retainer having a circular body with parallel flat end faces, said body having integral therewith a series of inwardly extending fingers whose thickness progressively decreases towards their inner ends and the inner end of each finger being substantially wider than its outer end; and a sealing ring of resilient deformable material enclosing and bonded to said fingers, said ring having a pair of aligned circular lobes which extend beyond the planes of said flat end faces.

3. A composite sealing device adapted to be compressed between a laminated structure and the head of a fastener having a shank passing through the structure, comprising an annular retainer having a circular body composed of rigid material, said retainer having flat parallel end faces, each end face being provided with a shallow depression along its inner margin, said body having integral therewith a plurality of inwardly extending fingers, said fingers being of lesser thickness than said body and the inner end of each finger being substantially wider than its outer end; a sealing ring of resilient deformable material enclosing and bonded to said fingers, said sealing ring having convexly curved surfaces extending out beyond the flat end faces of said retainer and a convexly curved inner periphery adapted to contact the shank of said fastener, said convexly curved surfaces terminating in aligned circular grooves in said ring adjacent the inner margin of said retainer, said grooves being spaced apart a distance substantially less than the thickness of said retainer, said ring being constructed so that compression thereof between said fastener head and laminated structure to a thickness equal to the thickness of said retainer causes the ring to be deformed and pressed into sealing contact with said fastener head, fastener shank and laminated structure.

4. A composite sealing device adapted to seal a cylindrical fastener comprising; a circular annular metal retainer adapted to surround said fastener, said retainer having a solid annular body with parallel flat end faces, and said body intermediate said end faces having a plurality of integral inwardly extending fingers of substantially lesser thickness than said solid body, each of said fingers having a plurality of exposed faces and the portions of said body connecting adjacent fingers having concave inner faces; a sealing ring composed of resilient deformable material, said ring being bonded in situ to all the exposed faces of said fingers and also to said concave inner faces of said body, said sealing ring have two aligned circular convex portions extending inwardly of said fingers, the thickness of the ring across said convex portions substantially greater than the thickness of said solid body.

5. A composite sealing washer adapted to seal the cylindrical shank of a fastener passing therethrough comprising; an annular metal retainer having a solid body with parallel flat end faces and a plurality of inwardly extending fingers of substantially lesser thickness than said solid body disposed midway between said end faces, each of said fingers having a plurality of exposed faces and the portions of said body connecting adjacent fingers having concave inner faces; and a rubber sealing ring vulcanized in situ and in contact with all the exposed faces of each of said fingers and also with said concave inner faces, said sealing ring having two aligned convex portions disposed inwardly of said fingers, the thickness of said ring across said convex portions being substantially greater than the distance between said flat end faces.

References Cited in the file of this patent

UNITED STATES PATENTS

| | | |
|---|---|---|
| 368,189 | Carter | Aug. 16, 1887 |
| 1,969,795 | Hewitt | Aug. 14, 1934 |
| 2,191,044 | Seligman | Feb. 20, 1940 |
| 2,208,620 | Baisch | July 23, 1940 |
| 2,396,005 | Gross et al. | Mar. 5, 1946 |
| 2,717,793 | Nenzell | Sept. 13, 1955 |

FOREIGN PATENTS

| | | |
|---|---|---|
| 828,180 | Germany | Jan. 17, 1952 |